United States Patent [19]

Frey et al.

[11] Patent Number: 4,483,634

[45] Date of Patent: Nov. 20, 1984

[54] KEYBOARD ARRANGEMENT

[75] Inventors: Werner U. Frey, Thalwil; Johannes Rometsch, Rickenbach; Hans Diem, Richterswil, all of Switzerland

[73] Assignee: International Standard Electric Corporation, New York, N.Y.

[21] Appl. No.: 513,124

[22] Filed: Jul. 13, 1983

Related U.S. Application Data

[63] Continuation of Ser. No. 324,218, Nov. 23, 1981, abandoned.

[30] Foreign Application Priority Data

Dec. 19, 1980 [CH] Switzerland ............... 9398/80

[51] Int. Cl.³ ................................ B41J 5/10
[52] U.S. Cl. .................... 400/489; 400/715; 400/488
[58] Field of Search ............ 400/488, 489, 88, 89, 400/715, 482, 484, 91, 92, 93, 94, 110, 111, 490, 473, 483, 87; 235/145 R, 145 A; 340/365 R, 365 A, 365 C, 365 E, 365 L, 365 P, 365 VL

[56] References Cited

U.S. PATENT DOCUMENTS 1,801,669  4/1931  Hintz et al. ..................... 400/715
3,990,565  11/1976  Felton et al. ................... 400/682 X

FOREIGN PATENT DOCUMENTS 577708   6/1933  Fed. Rep. of Germany ...... 400/488
1424662  1/1969  Fed. Rep. of Germany ... 340/365 R
966181   8/1964  United Kingdom ............... 400/489

Primary Examiner—Edgar S. Burr
Assistant Examiner—Charles A. Pearson
Attorney, Agent, or Firm—James B. Raden; William J. Michals

[57] ABSTRACT

In order to diminish the physical troubles often occurring with the usual keyboard arrangement, the alphanumeric keyboard is subdivided into two keyfields mounted on a support having a wedge-shaped extension towards the operator which extension is used as an arm rest. The keyfields are located in planes rising from the operator side of the keyboard which planes slope downward from the middle to the outside. In addition the keyfields enclose an angle open towards the operator in order to diminish the flexion of the hand with respect to the forearm needed with the prior one-piece keyboard. On both sides of these two keyfields two further keyfields are provided for numerical keys and/or function keys, for instance for data input devices. The additional keyfields are located in planes rising from the operator side of the keyboard without sloping to the outside.

11 Claims, 4 Drawing Figures

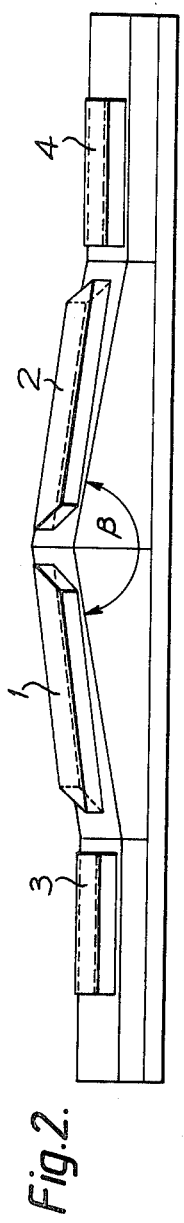
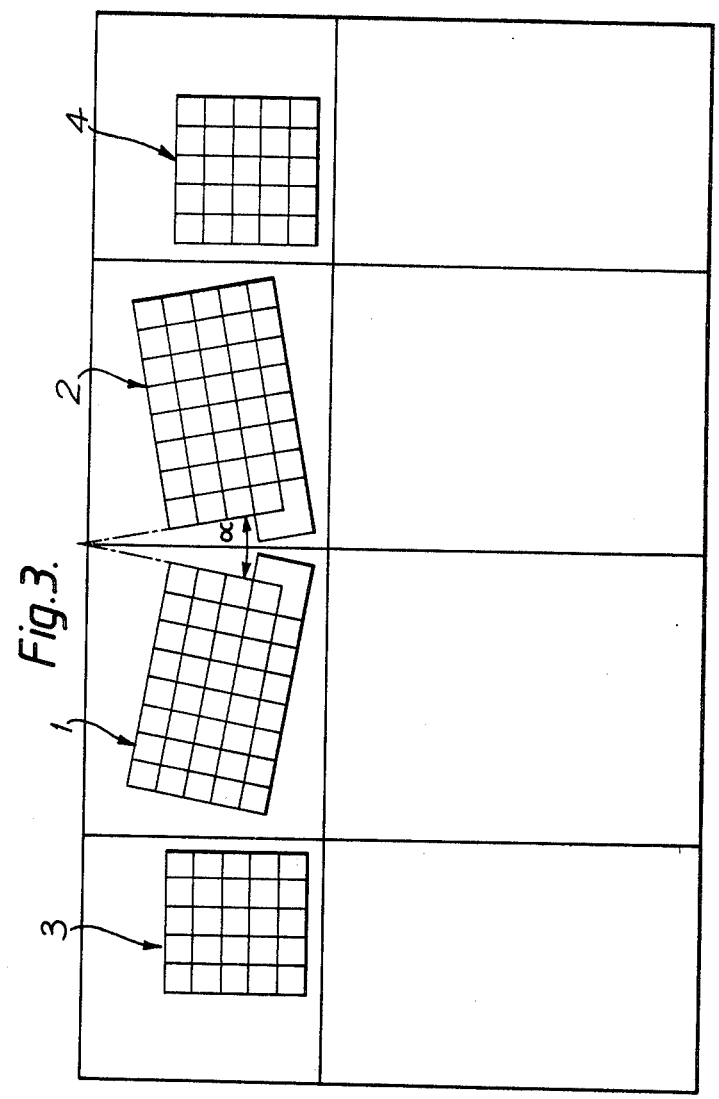
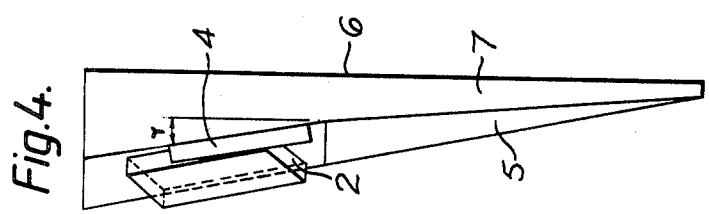

KEYBOARD ARRANGEMENT

CROSS REFERENCE TO RELATED APPLICATION

This application is a continuation of application Ser. No. 324,218, filed Nov. 23, 1981, now abandoned.

BACKGROUND OF THE INVENTION

The present invention relates to a keyboard arrangement for a typewriter or a data input device for computers or the like having a keyboard subdivided into keyfields each comprising a number of keys.

That the usual keyboard arrangement for a typewriter is not an ideal solution with respect to the arrangement of the keys, (five or six straight rows of keys), nor with respect to the allocation of the individual characters to the keys is proven by the fact a large number of patents were granted during the past fifty years for new keyboard arrangements which are concerned mainly with the allocation of the characters to the keys since with mechanical typewriters and electrical typewriters with mechanical control there were close limits for the arrangement of the keys other than in straight rows. The use of a common axis for all key levels prevented an arrangement of all keys to be operated by a particular finger within a column perpendicular to the row of keys.

The worldwide spread of this arrangement and the worldwide training of specialists for touch typing lead to the maintenance of this keyboard arrangement up to now, even with a partial extension of the keyboard with special keys, although nowadays especially data input devices are provided with fully electric keyboards giving complete freedom with respect to the key arrangement and key allocation.

Investigations of experts have shown that the complaints of operators spending most of their working time with the operation of a keyboard of the type of the usual typewriter keyboard with respect to troubles in hands, arms, shoulders and joints are based on the keyboard being extremely adverse from the ergonomical point of view.

Therefore attempts have been made with respect to a less adverse design of key arrangements. For instance, in U.S. Pat. No. 3,990,565 it was proposed to operate a usual typewriter keyboard via two sets of electrical push-buttons located in separate, widely adjustable housings with the aid of solenoids. Besides the large demand of space and weight this solution has the drawback that the distance between the operator and the typing system is so enlarged that optical aids are needed to read the typed text. Further the wide field of possible positions of the housings would lead to a long personal test phase of the operator.

From the German Pat. DE-OS No. 2 218 065 there is known a keyboard arrangement wherein the usual typewriter keyboard is subdivided into two substantially rectangular fields the narrow sides of which enclose an angle of about 60° open towards the operator. This arrangement of two keyfields in the same plans may help to diminish some of the above mentioned troubles especially those caused by the flexion of the hand with respect to the forearm needed for the usual one-piece keyboard.

SUMMARY OF THE INVENTION

It is therefore, an object of the present invention to provide a keyboard arrangement which at least diminishes all of the above mentioned troubles, which may be used for the usual QWERTY-keyboard, but is not limited thereto, and which is adapted to be provided with additional keyfields, e.g. for function keys or numerical inputs. Further the keyboard arrangement of the present invention is adapted to be used on a normal table of suitable height without special recesses.

A feature of the present invention is the provision of a keyboard arrangement for typewriters and data input devices comprising at least two adjacent keyfields each having a plurality of keys mounted on a support having a substantially rectangular basal surface settable on a plane surface, each of the two keyfields being disposed in a different one of two planes inclined with respect to each other and intersect each other on a line perpendicular to an operator-side edge of the support at an angle $\beta$ open towards the basal surface, the intersecting line intersecting a plane parallel to the basal surface at an angle $\gamma$ open towards an edge of the support opposite the operator-side edge of the support; the plurality of keys of each of the two keyfields being disposed in a plurality of rows and columns with the columns of one of the two keyfields intersecting the columns of the other of the two keyfields in an angle $\alpha$ open towards the operator-side edge of the support; and the support includes an integral arm rest adjacent the operator-side edge thereof.

BRIEF DESCRIPTION OF THE DRAWING

Above-mentioned and other features and objects of this invention will become more apparent by reference to the following description taken in conjunction with the accompanying drawing, in which:

FIG. 2 is a front view of the keyboard arrangement of FIG. 1;

FIG. 3 is a top plan view of the keyboard arrangement of FIG. 1; and

FIG. 4 is a side view of the keyboard arrangement of FIG. 1.

DESCRIPTION OF THE PREFERRED EMBODIMENT

Figure 1:
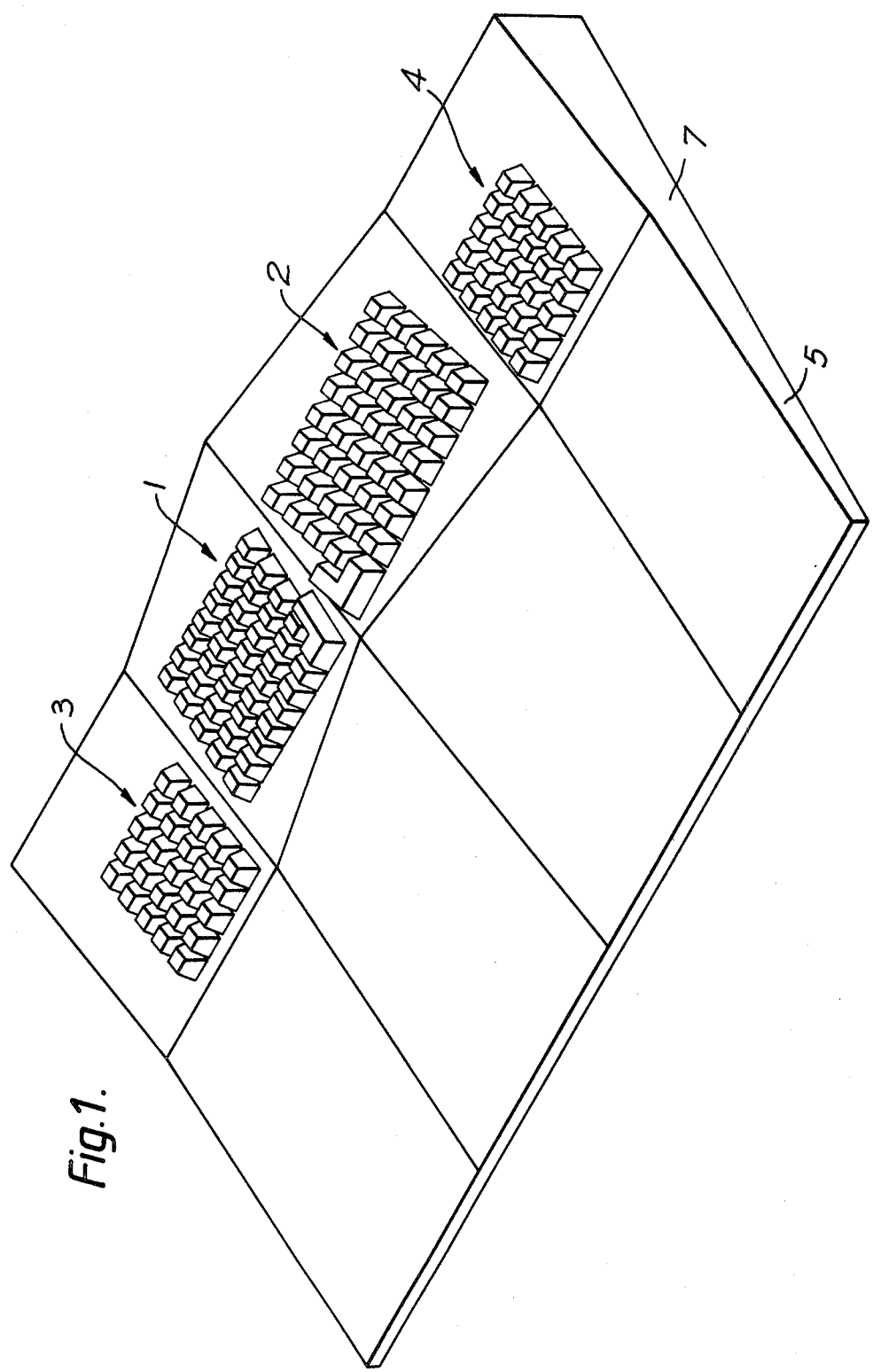
FIG. 1 is a perspective view of the keyboard arrangement according to the principles of present invention.

FIGS. 1 to 4 show a keyboard arrangement including four individual keyfields 1,2,3 and 4 each of which comprises a number of keys delivering via a cable (not shown) an electrical signal to a typewriter or data input device. The keyfields 1 to 4 are mounted on support 5 which comprises a wedge-shaped extension 7 extending towards the operator. Preferably the keyfields 1 and 2 contain the usual alphanumeric keys including the function keys of a typewriter which keys are to be operated by the left and the right hands, respectively. The keyfields 3 and 4 may contain the keys for a calculator and/or the function keys, for instance, for a data input device or a text handling apparatus.

Instead of the above mentioned keyboard arrangement including four parts there are other possible keyboard arrangements of the same kind. A pure typewriter keyboard could include two parts and could comprise only the keyfields 1 and 2 together with their extensions. Further a three-part embodiment would be possible including an additional keyfield on the right- or left-hand side. Further it would also be possible with a four-part keyboard to have the same keys for the two keyfields 3 and 4 in order to offer the same possibilities to left-handers and right-handers with the same keyboard arrangement.

As it can be seen from the drawing the keys within a keyfield are arranged not only in rows as is usual in prior keyboard arragements, but also in columns perpendicular to the rows facilitating the access to the keys allocated to a particular finger and resulting in a less expensive structure of the keyfield. Obviously there are other arrays of the individual keys possible, for instance in arc-like rows with the concave side of the arcs facing towards the operator. This would result in a better adaptation to the different lengths of the fingers. But with a consistent realization of this principle there would result different distances of the keys in the different rows.

From FIG. 3 it can be seen that the directions of the columns of the keyfield 1 relative to with those of the keyfield 2 enclose an aperture angle $\alpha$ of 5° to 30° and is preferably about 20°. Further, as best seen in FIG. 2, the planes or surfaces of support 5 upon which keyfields 1 and 2 are mounted are sloped towards the outside and enclose a lateral angle $\beta$ of 140° to 180° and is preferably about 165° open towards basal surface 6 of support 5. Further, as best seen in FIG. 4, all of the four keyfields are arranged in planes or surfaces of support 5 rising relative to a horizontal plane at an angle $\gamma$ of 0° to 15° and is preferably about 10°.

As already mentioned a wedge-shaped extension 7 extends from the keyfields towards the operator. This extension is used as an arm rest. The wedge shaped portion tapers toward the operator-edge at an angle of inclination substantially equal to the angle $\gamma$ and tapers toward a side edge perpendicular to the operators side edge at an angle which is one half of the angle $\beta$ with respect to a line perpendicular to the basal surface. Since with an arm rest the operation of a key is performed by a wrist and/or finger motion only the force needed for the operation of a key must be smaller than that with a keyboard without an arm rest, since in the latter case the arm helps to operate the key. The operation force can be smaller than usual without drawback, since in the normal or inoperative position the fingers no longer rest on the keys due to the arm rest.

The depth of the arm rest results from the height of the keys and from the selected angle of inclination which is preferably equal to the front angle $\gamma$. This principle can be maintained also by using keys of extremely low height whereby the table carrying the keyboard arrangement would take over partially the function of the arm rest.

The aperture angle $\alpha$ between the two keyfields 1 and 2 results in the hands having to be flexed with respect to the longitudinal axis of the forearm by an amount lower than needed for a one-piece keyfield as described in the above-mentioned German Patent DE-OS No. 2 218 065.

The chosen lateral angle $\beta$ of about 165° is a good compromise. Certainly with a vertical-like arrangement of the keyfields 1 and 2 in a back to back configuration there would be needed no flexion of the forearm, but then the hand had to perform a flexion in a vertical plane leading to substantially worse results than a moderate rotation of the forearm as shown by tests. Further, an arrangement of this kind would exclude any "hunt and peck" typing, such typing may not be excluded especially for a temporary allocation of special characters to some or all keys. Further, a vertical-like arrangement would result in a height of the keyboard arrangement which is not admissible.

For the keyfields 3 and 4 containing function keys and/or numeric keys less often used it is possible to dispense with an arrangement sloping down towards the outer sides in order to receive a low height of the keyboard arrangement. Further, an oblique position of the keyfields 3 and 4 with respect to the transverse axis of the keyboard arrangement is dispensed with. This is possible since due to the relatively large distance of keyfields 3 and 4 from the intersection line of the keyfields 1 and 2 the hands are substantially not subjected to a flexion with respect to the longitudinal axis of the forearm.

The keyfields can be provided with keys of any kind with the sole condition that upon the operation of a key an electrically usable and transmittable signal is produced. Further it is possible to have an integrated keyfield instead of an array of individual keys.

The keyfields can be constructed as a stepped arrangement or as a flat arrangement, for instance the concave stroking surfaces of the keys may lie in planes parallel to the basal surface of the keyboard arrangement with a different height for each row of keys or the concaves stroking surfaces of all keys can lie in a common oblique plane. The different constrution as a stepped keyboard or as a flat keyboard can be achieved by a different construction of the key shafts or key heads whereby for both embodiments of the keyboard the same shape of the key head can be used for the complete keyboard arrangement, perhaps with the exception of some functional keys, so that the production and the replacement of key heads is substantially improved. While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A keyboard arrangement for typewriters and data input devices comprising:
    at least two adjacent keyfields each having plurality of keys mounted on a support having a substantially rectangular basal surface settable on a plane surface, each of said two keyfields being mounted on a different one of two surfaces of said support opposite said basal surface inclined with respect to each other and intersect each other on a line perpendicular to an operator-side edge of said support at an angle $\beta$ less than 180° open towards said basal surface, said intersecting line intersecting a plane parallel to said basal surface at an angle $\gamma$ open towards an edge of said support opposite said operator-side edge of said support;
    said plurality of keys of each of said two keyfields being disposed in a plurality of rows and columns with said columns of one of said two keyfields intersecting said columns of the other of said two keyfields in an angle $\alpha$ open towards said operator-side edge of said support; and said support includes a wedge shaped portion extending from said two surfaces of said support to said operator-side edge of said support to provide an arm rest for an operator and wherein said wedge shaped portion tapers toward said operator-edge at an angle of inclination substantially equal to said angle γ and tapers toward a side edge perpendicular to said operators side edge at an angle which is one half of β with respect to a line perpendicular to said basal surface.

2. A keyboard arrangement according to claim 1, wherein
said angle α has a value disposed between 5° and 30°, said angle β has a value disposed between 140° and 180° and said angle γ has a value disposed between 0° and 15°.

3. A keyboard arrangement according to claim 1 or 2, wherein
said angle α has a value of approximately 20°, said angle β has a value of approximately 165° and said angle γ has a value of approximately 10°.

4. A keyboard arrangement according to claim 3, wherein
said plurality of keys of both of said two keyfields include alphanumeric and functional keys of a typewriter.

5. A keyboard arrangement according to claim 3, wherein
said plurality of keys of both of said two keyfields include alphanumeric keys of a data input device; and further including
at least one additional keyfield disposed adjacent to a side of one of said two keyfields having a plurality of other keys for said data input device.

6. A keyboard arrangement according to claim 3, further including
at least one additional keyfield having an additional plurality of keys disposed in rows and columns, said additional keyfield being disposed adjacent a side of one of said two keyfields in an additional surface of said support intersecting said plane parallel to said basal surface in said angle γ, said additional surface of support having an edge thereof adjacent said operator-side edge of said support parallel to said rows of said additional plurality of keys and said rows of said additional plurality of keys are parallel to said operator-side edge of said support.

7. A keyboard arrangement according to claim 6, wherein
two of said additional keyfields are provided each disposed adjacent a side of a different one of said two keyfields.

8. A keyboard arrangement to claim 1 or 2, wherein
said plurality of keys of both of said two keyfields include alphanumeric and functional keys of a typewriter.

9. A keyboard arrangement according to claim 1 or 2, wherein
said plurality of keys of both of said two keyfields include alphanumeric keys of a data input device; and further including
at least one additional keyfield disposed adjacent to a side of one of said two keyfields having a plurality of other keys for said data input device.

10. A keyboard arrangement according to claims 1 or 2, further including
at least one additional keyfield having an additional plurality of keys disposed in rows and columns, said additional keyfield being disposed adjacent a side of one of said two keyfields in an additional surface of said support intersecting said plane parallel to said basal surface in said angle γ, said additional surface of said support having an edge thereof adjacent said operator-side edge of said support parallel to said rows of said additional plurality of keys and said rows of said additional plurality of keys are parallel to said operator-side edge of said support.

11. A keyboard arrangement according to claim 10, wherein
two of said additional keyfields are provided each disposed adjacent a side of a different one of said two keyfields.

* * * * *